(12) United States Patent
Venkatraman et al.

(10) Patent No.: US 7,639,685 B2
(45) Date of Patent: Dec. 29, 2009

(54) METHOD AND APPARATUS FOR MULTICAST FORWARDING

(75) Inventors: Vivek Venkatraman, Santa Clara, CA (US); Ajay Virginkar, Fremont, CA (US); Sanjay Khanna, Fremont, CA (US); Balaji Rajagopalan, Sunnyvale, CA (US); David S. Curry, San Jose, CA (US)

(73) Assignee: Tellabs San Jose, Inc., Naperville, IL (US)

( * ) Notice: Subject to any disclaimer, the term of this patent is extended or adjusted under 35 U.S.C. 154(b) by 389 days.

(21) Appl. No.: 11/603,932

(22) Filed: Nov. 22, 2006

(65) Prior Publication Data

US 2007/0133532 A1 Jun. 14, 2007

Related U.S. Application Data

(63) Continuation-in-part of application No. 11/413,957, filed on Apr. 27, 2006, now abandoned.

(60) Provisional application No. 60/740,862, filed on Nov. 29, 2005.

(51) Int. Cl.
 *H04L 12/56* (2006.01)
 *H04J 1/16* (2006.01)
(52) U.S. Cl. .................. 370/390; 370/412; 370/419
(58) Field of Classification Search ................. 370/390, 370/432, 412, 419
 See application file for complete search history.

(56) References Cited

U.S. PATENT DOCUMENTS 6,728,777 B1 4/2004 Lee et al.

| 2005/0021825 | A1 | 1/2005 | Kishore et al. |
| 2006/0018335 | A1* | 1/2006 | Koch et al. .................. 370/432 |
| 2006/0165111 | A1* | 7/2006 | Varma ........................ 370/428 |
| 2007/0116014 | A1* | 5/2007 | Shuen et al. ........... 370/395.53 |

FOREIGN PATENT DOCUMENTS

EP 1 557 976 A1 7/2005
WO WO 02/47384 A1 6/2002

OTHER PUBLICATIONS

International Preliminary Report on Patentability, International Application PCT/US2006/045921, 13 pages, Jan. 30, 2008.

\* cited by examiner

*Primary Examiner*—John Pezzlo
(74) *Attorney, Agent, or Firm*—Hamilton, Brook, Smith and Reynolds, P.C.

(57) ABSTRACT

A method or corresponding apparatus in an exemplary embodiment of the present invention determines how many copies of a multicast packet are to be sent, as copies, to multiple destinations based on information in the multicast packet and a group (e.g., bridge node) with which the packet is associated. The copies of the multicast packets are then generated. After generating the copies, an action to take for each copy is determined. This determination is made using the information in the multicast packet and based on the group with which the packet is associated. After the action is determined for each copy, the action is performed on each copy. Through use of an embodiment of the present invention, memory space is conserved, allowing for continued use of a device in a multicast environment of an ever growing network, such as the Internet.

23 Claims, 10 Drawing Sheets

METHOD AND APPARATUS FOR MULTICAST FORWARDING

RELATED APPLICATIONS

This application is a continuation-in-part of U.S. patent application Ser. No. 11/413,957, filed Apr. 27, 2006 now abandoned, which claims the benefit of U.S. Provisional Application No. 60/740,862, filed on Nov. 29, 2005. The entire teachings of the above applications are incorporated herein by reference.

BACKGROUND OF THE INVENTION

As networks such as the Internet have increased in size, demand for data streams (e.g., video) has increased to an extent that point-to-point communications of data streams have become inefficient. In an effort to improve efficiency, multicasting has become a useful technique for simultaneously delivering a data stream from a single source network node, such as a content server, to multiple end user network nodes.

Thus, multicasting is used in industry today to enable a network node to send a single packet or a data stream of information to multiple destination nodes in one transmission. The ability for a network node to send a single packet of information to multiple destinations is useful, but has limitations, such as scalability.

SUMMARY OF THE INVENTION

A method or corresponding apparatus in an exemplary embodiment of the present invention determines how many copies of a multicast packet to send, as copies, to multiple destinations based on (i) information in the multicast packet and (ii) a group (e.g., bridge node) with which the packet is associated. After generating the copies, a system employing the embodiment determines an action to take for each copy. This determination is made using information in the multicast packet and information based on the group with which the multicast packet is associated. The system thereafter performs the action on each copy.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of example embodiments of the invention follows.

Figure 1:
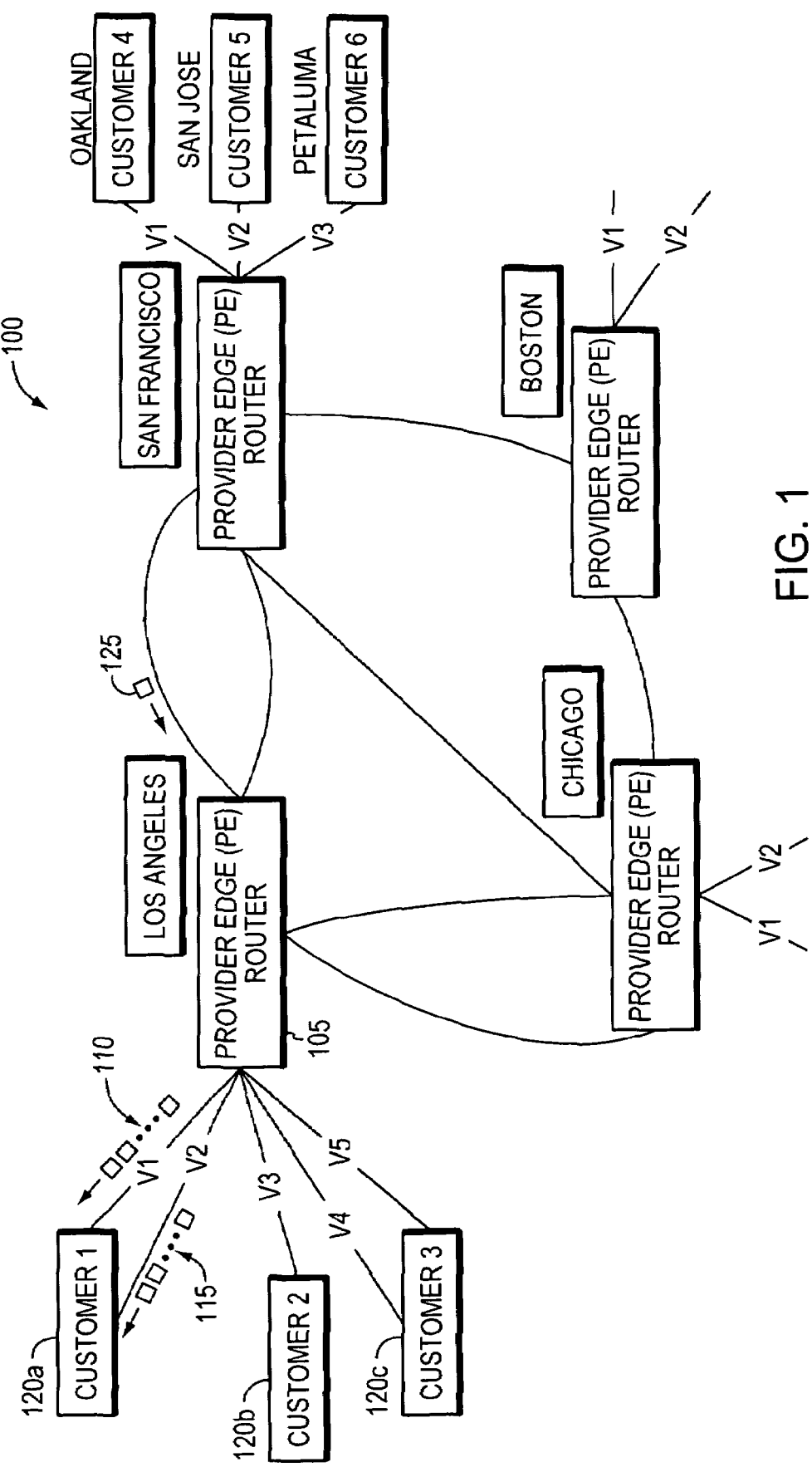
FIG. 1 is a network diagram of a network having network nodes multicast forwarding ("multicasting") packets using an embodiment of the present invention.

FIG. 1 is a high level network diagram of a network 100 in which multicast forwarding may be performed. In this network 100, a Provider Edge (PE) router 105 is connected to multiple end nodes (e.g., customers 1-3 120a-c). Using these connections, the PE router 105 may send copies of a multicast packet 125, such as packets 110 or packets 115, to end nodes, represented by a single node (e.g., customer 1 120a), that may be on a virtual private network V1 or multiple virtual private networks V1 and V2. To (i) determine whether a multicast packet 125 is a multicast packet, (ii) generate copies 110, 115 of the multicast packet 125, and (iii) prepare the copies 110, 115 for sending to specific end nodes, the PE router 105 may use line cards (not shown) configured to perform such tasks.

Figure 2:
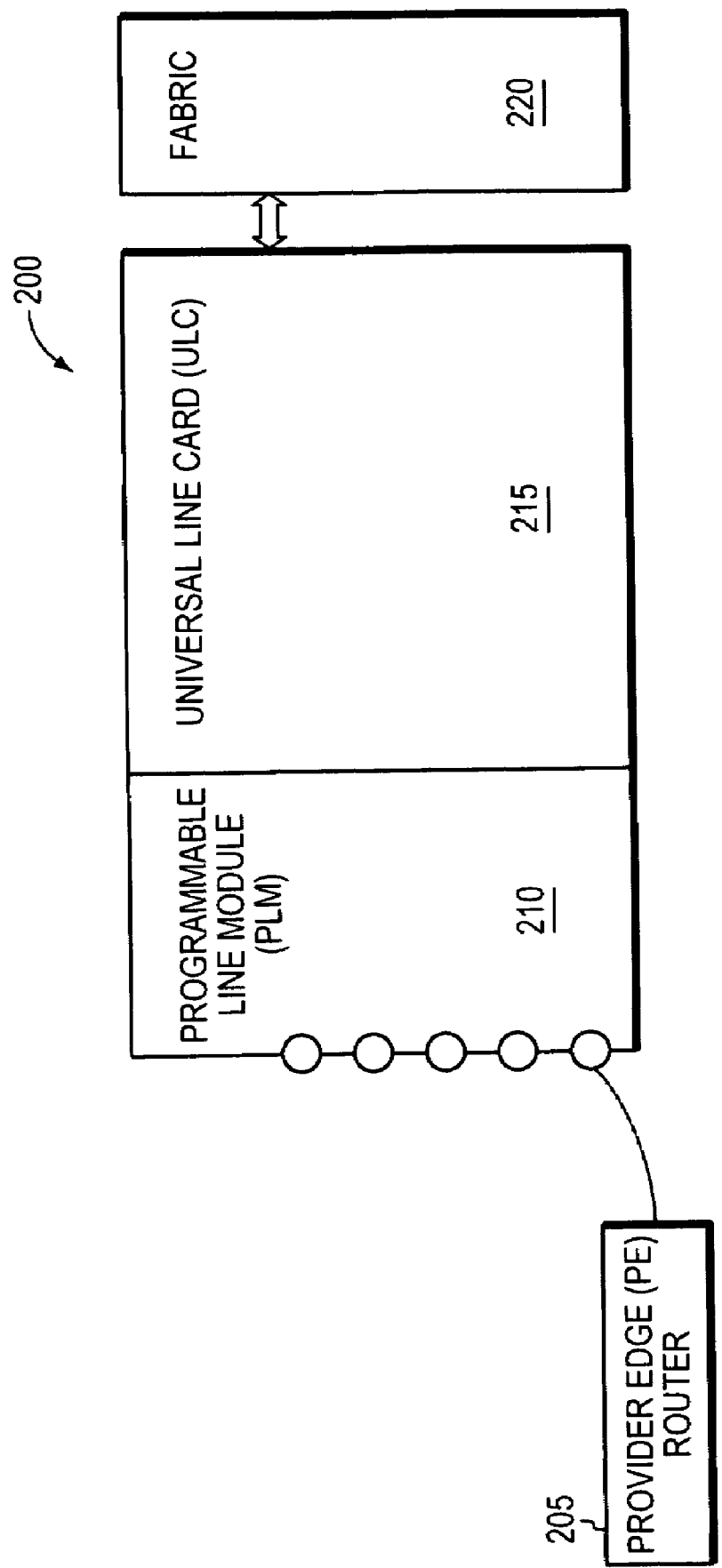
FIG. 2 is a high level view of an example line card and associated components used in a network node to perform the multicasting.

FIG. 2 is a high level view of an example line card 200 that includes a Programmable Line Module (PLM) 210 and a Universal Line Card (ULC) 215 and interacts with (shown) or is integrated into (not shown) a Provider Edge (PE) router 205. In this example embodiment, the PE router 205 communicates with the ULC 215 using the PLM 210. Similarly, the ULC 215 connects to a switch fabric 220 in such a manner as to send and receive copies of multicast packets (not shown). In operation in an example embodiment, the ULC 215 makes a determination that a packet is a multicast packet and makes a decision to copy and send the copies of the multicast packet.

Figure 3:
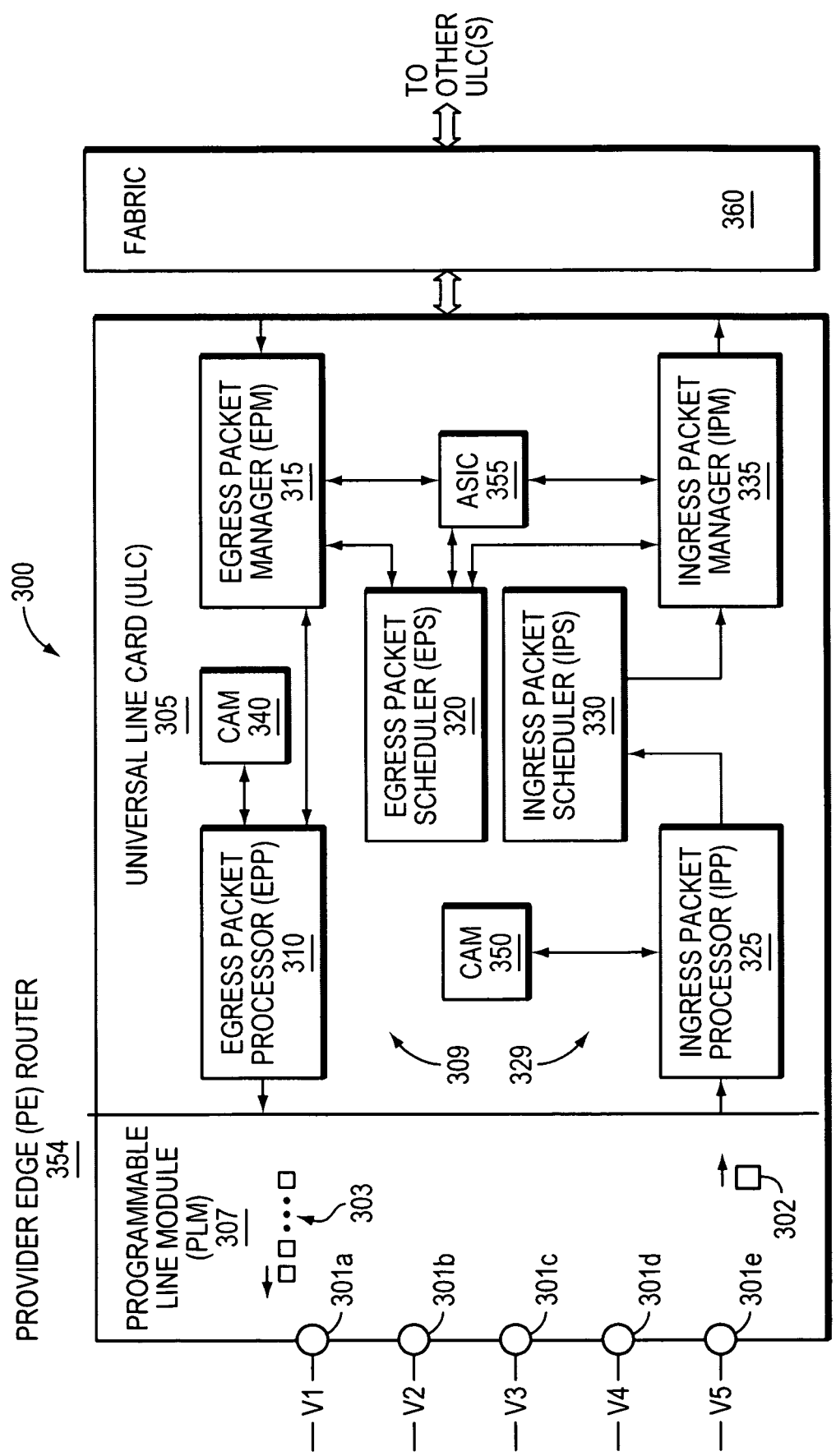
FIG. 3 is a block diagram of another example line card.

FIG. 3 is a diagram of an example line card 300 with details of egress components 309 and ingress components 329 in a ULC 305. As in FIG. 2, a PLM 307 in FIG. 3 is used to form a connection to a PE router 345 and the ULC 305. The ingress and egress components 309, 329 process incoming and outgoing packets, respectively, whether they are unicast or multicast packets.

In an example embodiment, the ULC 305 contains an Egress Packet Processor (EPP) 310, an Egress Packet Manager (EPM) 315, and an Egress Packet Scheduler (EPS) 320. The EPP 310, EPM 315, and EPS 320 interact together to process a multicast packet (not shown) received from a switch fabric 360. In addition to these egress components 309, a Content Addressable Memory (CAM) 340, which has a total fixed memory but may be replaced with a CAM with larger memory, may be used by the EPP 310 to help make decisions during processing.

Similar to the egress components 309 and Content Addressable Memory (CAM) 340, the ULC 305 also includes ingress components 329 and has its own CAM 350. The ingress components 329 in the example ULC 305 include an Ingress Packet Processor (IPP) 325, Ingress Packet Manager (IPM) 335, Ingress Packet Scheduler (IPS) 330, and the CAM 350. These ingress components 329 with associated CAM 350 are capable of performing the same or similar tasks as the egress components.

In addition to the egress and ingress components 309, 329, an Application Specific Integrated Circuit (ASIC) 355 may be employed. The ASIC 355 allocates memory that stores configuration information used during processing of a multicast packet (not shown). The ASIC 355 typically has limited memory and may be located separately or within, either physically or logically, the EPS 320 or IPS 330. The location of the ASIC 355 may be based on whether the egress or ingress components 309, 329 are performing multicast forwarding.

In operation, a multicast packet 302 may be received and processed by the ingress components 329. The ingress components 329 may forward the multicast packet 302 to a switch fabric 360, which, in turn, may direct the multicast packet 302 to the egress components 309 for delivery to local subinterface(s) 301a-e or to egress components on another ULC (not shown) for delivery to remote subinterface(s).

When performing multicast forwarding, effective use of memory in the ASIC 355 is useful. The ASIC 355 typically has 4096 k of memory, so storing information for generating multiple copies of multicast packets for each group (i.e., V1, V2, V3 and so forth) burdens the memory. To minimize or reduce storage in the ASIC 355 of multiple copies of the information used to generate multiple copies of the multicast packet by the ASIC 355, a three stage process, described below in reference to FIG. 4B, may be used. The three stage process provides an example technique to generate copies of a multicast packet in a manner that effectively uses memory within the ASIC 355. Memory, such as the CAM 340, may be employed as part of the example three stage process. This three stage process allows the ASIC 490 to store less information used to generate duplicate multicast packets. In one embodiment, the CAM 340 stores configuration information (e.g., (i) how many copies to generate and (ii) schedule information). By having configuration information relating to the number of copies to generate and other information formerly stored in the ASIC 355 but now stored external from the ASIC 355, an embodiment of the present invention can store less information in the ASIC 355, such as scheduling information. Thus, fewer copies of information used to generate multicast packets are stored in the ASIC 355, resulting in a more effective use of this limited memory location.

To further illustrate this point, a single unit of memory is allocated for a subinterface regardless of how many bridge groups (i.e., V1, V2, V3, and so forth) are supported by the ASIC. Thus, the total number of units of memory used is equal to the maximum number of subinterfaces that exist on any bridge group (i.e., V1, V2, V3, and so forth), where a single unit of memory is used to generate one copy. For example, if bridge groups V1, V2, and V3 have 4, 5, and 6 interfaces (i.e., physical subinterfaces, or ports), respectively, then six units of memory are used in the ASIC. In previous implementations, for the same number of bridge groups and subinterfaces, fifteen units of memory would have been stored in the ASIC 355 and used by the ASIC 355 to generate the copies of the multicast packet. In this way, the ASIC's limited memory is conserved.

It should be understood that the example three stage process may alternatively use more or fewer stages. Embodiments with other number of stages that make effective use of the limited ASIC memory or other device memory in a multicast environment are also considered within the scope of the present invention.

Figure 4A:
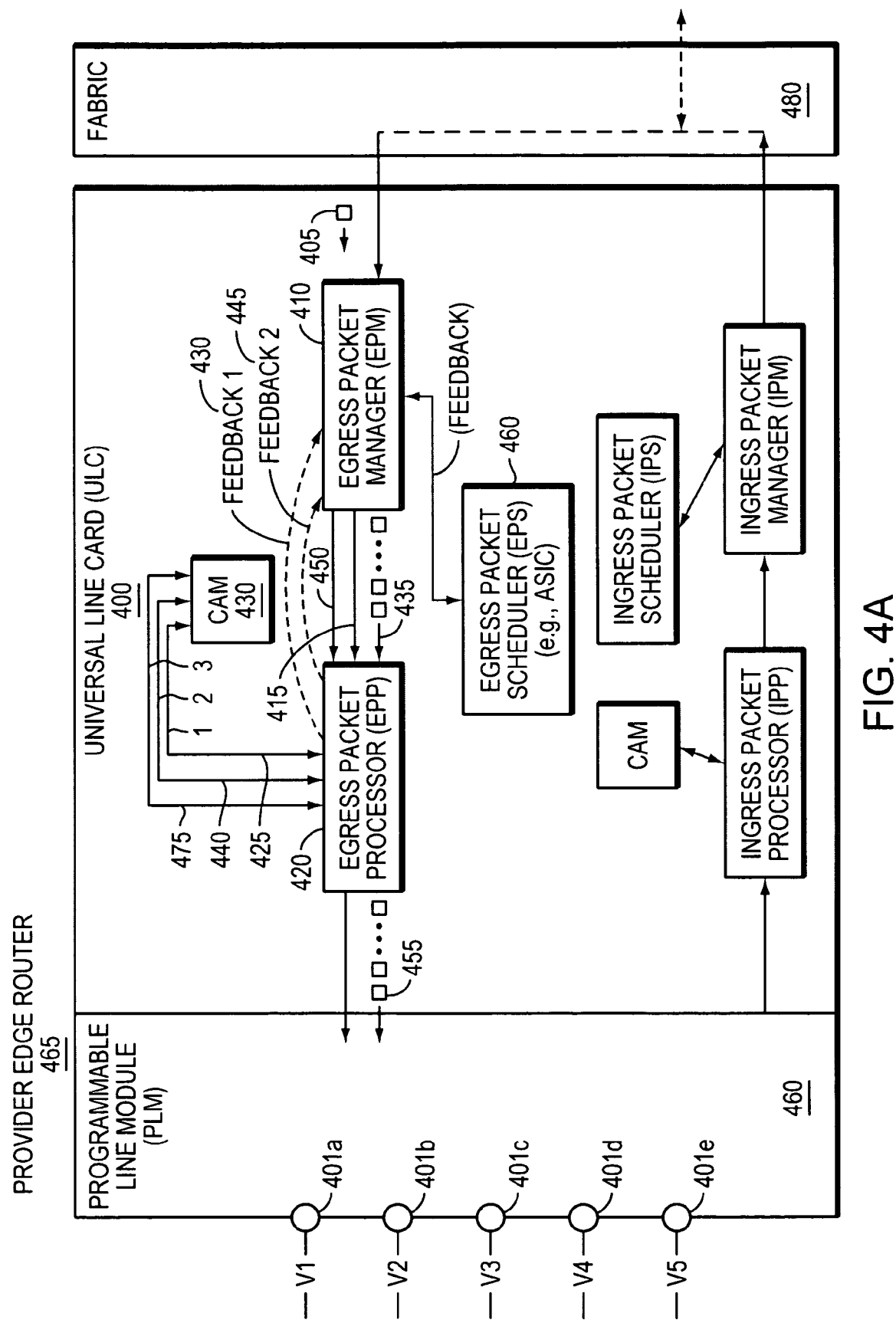
FIG. 4A is a schematic diagram of another example line card.

FIG. 4A shows a detailed diagram of how processing of a multicast packet 405 is performed by an example ULC 400. To begin processing, a multicast packet 405 is sent by a switch fabric 480 and received by an Egress Packet Manager (EPM) 410. The EPM 410 sends the multicast packet 405 via a connection 415 to an Egress Packet Processor (EPP) 420 to determine configuration information by using a look-up 425 or otherwise determining configuration information. In the case of a look-up 425, the look-up 425 may be performed by accessing a Content Addressable Memory (CAM) 470. In one embodiment, at least some information stored in the CAM 470 represents how many copies of the multicast packet 405 are to be sent, as copies, to multiple destinations. This information is returned to the EPP 420 and sent as feedback, Feedback 1, 430 to the EPM 410. Upon receiving the feedback 430, the EPM 410 sends the feedback 430 to an Egress Packet Scheduler (EPS) 460 for processing. In particular, the EPS 460 may make a determination of whether the look-up 425 failed. If the look-up 425 failed, the multicast packet 405 is dropped, and no further processing is performed. If the look-up 425 was successful, copies 435 of the multicast packet 405 are generated by the EPS 460 and sent to the EPP 420 via a connection 415 to the EPM 410.

After receiving the generated copies, the EPP 420 performs another look-up 440, or otherwise determines or retrieves information, in the CAM 470 to determine what action should be taken for each of the copies generated. After the EPP 420 completes this look-up 440, a second feedback, Feedback 2, 445 is returned to the EPM 410. The EPM 410 responds by sending each copy along with the necessary action to perform, i.e., Feedback 2 445, to the EPS 460. The EPS 460, in turn, performs the action indicated for each copy and sends the copies 435 of the multicast packets back to the EPP 420.

After receiving the multicast packets, the EPP 420 sends the copies 435 as processed copies 455 based on information, such as schedule information, provided by the EPS 460 along with the appropriate information to a Programmable Line Module (PLM) 460. Upon receiving the multicast packets 405, the PLM 460 sends the multicast packets to a PE Router 465 where these multicast packets are sent to the location specified by the EPS 460 and possibly supplemented with information determined in a third look-up 475. The processed copies 455 may also be encapsulated by the EPP 420 with the appropriate header or overhead information for communication with another node, such as a customer edge node. Based on the information in the packets 455, the PLM 460 sends the packets 455 via a subinterface 401a-e to the specified destinations.

Similar to the egress process described above, an ingress process may be capable of performing the same or a similar process in a similar manner.

Figure 4B:
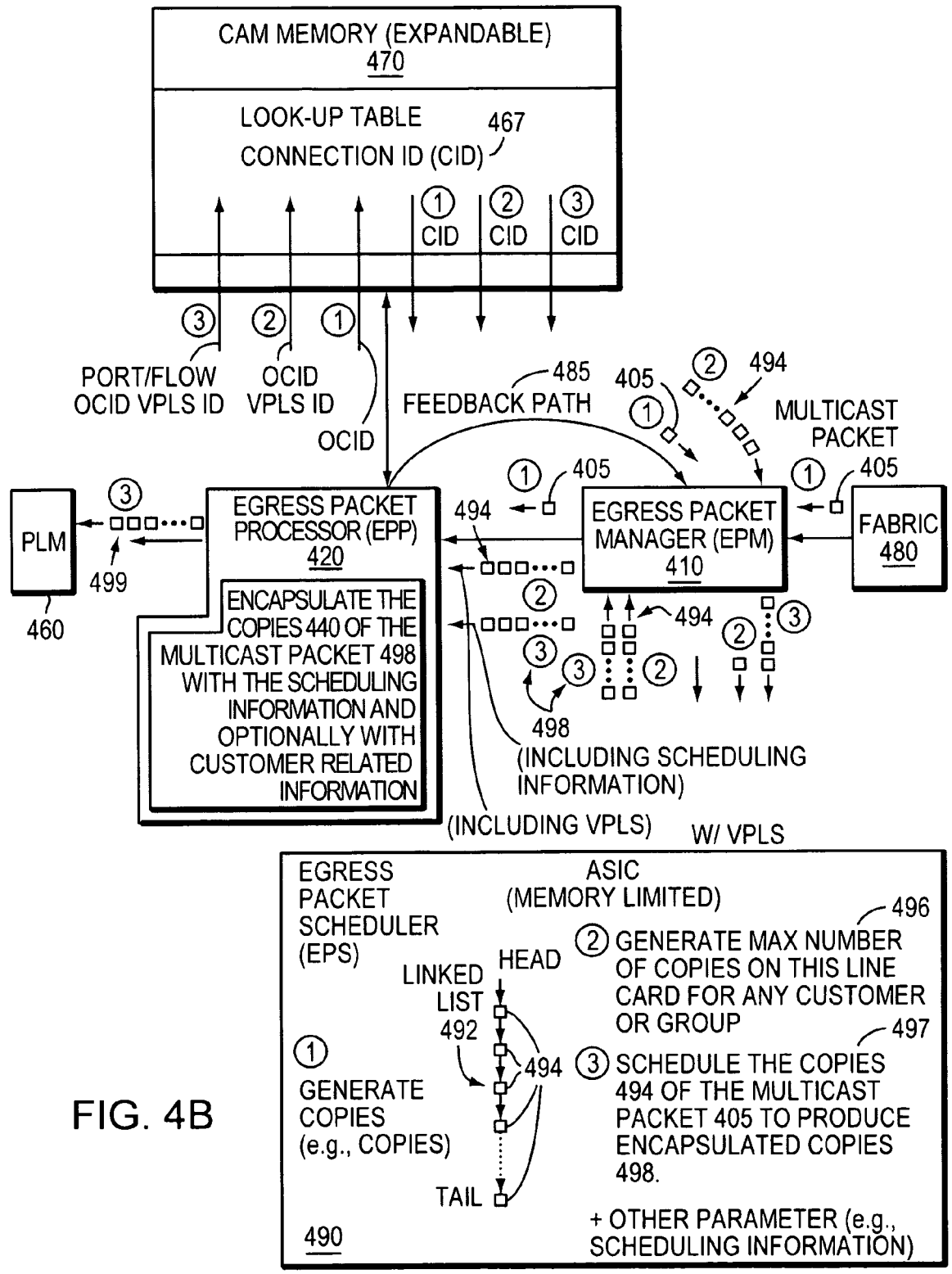
FIG. 4B is a schematic diagram of another example line card illustrating egress operations.

FIG. 4B is an exploded view of an egress process described above in reference to FIG. 4A. Specifically, a multicast packet 405 is received on a line card's switch fabric 480. This switch fabric 480 contains a multicast Output Connection Identifier (OCID) (not shown). The OCID has a corresponding OCID Static Random Access Memory (SRAM) (OSR) that indicates the multicast packet 405 is a multicast packet to which multicast processing is to be applied.

The multicast process can be viewed as having three stages as seen in FIG. 4B. Each stage is represented by the appropriate numerical representation (e.e., 1, 2, or 3). In an example embodiment, in Stage 1, a multicast packet 405 is sent to the EPM 410, which, in turn, sends the multicast packet 405 to the EPP 420. After receiving the multicast packet 405, the EPP 420 performs a look-up using the CAM 470. The CAM 470 look-up is done using the OCID of the multicast packet as a look-up key along with a Virtual Private LAN Services Identifier (VPLSID) which is associated with the multicast packet 405. The OCID and VPLSID information is typically stored in the multicast packet header. After performing the CAM 470 look-up, a Connection Identifier (CID) 467 is returned from the CAM 470. In response to receiving the CID 467, the EPP 420 sends the multicast packet to the EPM 410, via a feedback path 485, along with the CID 467. The EPM 410, in turn, sends the CID 467 and the multicast packet 405 to the Application Specific Integrated Circuit (ASIC) EPS 490 to begin Stage 2. It should be understood that the ASIC 490 may include circuitry to perform other processes.

In Stage 2, the ASIC EPS 490 uses the CID 467 in the multicast packet 405 to determine the number of copies 494 to generate 496 on this line card for any customer or group. A pointer to a node in a linked list 492, for example, can be used in this capacity. The multicast packets 494 are then generated and sent to the EPM 410. In an example embodiment, the linked list 492 is employed to generate copies of the multicast packet 405. For example, if there are four copies to be sent and the linked list 492 includes six nodes, the pointer (not shown) references a node two nodes "downstream" of a head node and four nodes "upstream" of a tail node. In this way, memory in the ASIC 490 is conserved. In other embodiments, an array or other data structure may be employed. For example, single or double linked lists may be implemented.

Continuing to refer to Stage 2 in FIG. 4B, the EPM 410 sends the multicast packets 494, including the CID 467 and the VPLSID, to the EPP 420 to perform a second look-up. The EPP 420 performs a CAM 470 look-up to determine the actual port/flow OCID (i.e., CID 467), as well as other parameters relating to the multicast packet 405, such as a mesh group and an egress flow Identifier (ID) for a VPLS. If the CAM 470 look-up fails, the multicast packet 405 is dropped. If the look-up is successful, the packets are returned via the feedback path 485 to the EPM 410. The EPM 410 sends the packets 494 along with the other parameters back to the ASIC 490 to begin Stage 3.

Stage 3 begins with the ASIC EPS 490, using the parameters sent via the feedback path 485, to schedule the copies 494 of the multicast packet 405 to produce copies 498 with scheduling information. These encapsulated copies 498 of multicast packet 405 are sent back to the EPM 410 with the port/flow OCID VPLS instance and other parameters or scheduling information. The EPP 420 may perform a final CAM 470 look-up using the port/flow OCID and the VPLS instance to determine the CID 467 for the copies 498 of the multicast packet 405 and encapsulate the multicast packets 498. This information is returned to the EPP 420, which, based on this information, sends the encapsulated multicast packets 499 to the PLM 460. Thus, the copies 499 of the multicast packet 405 are forwarded to destination nodes (e.g., client edge (CE) nodes).

FIGS. 5A-5I show expanded views of the components of FIG. 4A in view of the three stages of FIG. 4B.

Figure 5A:
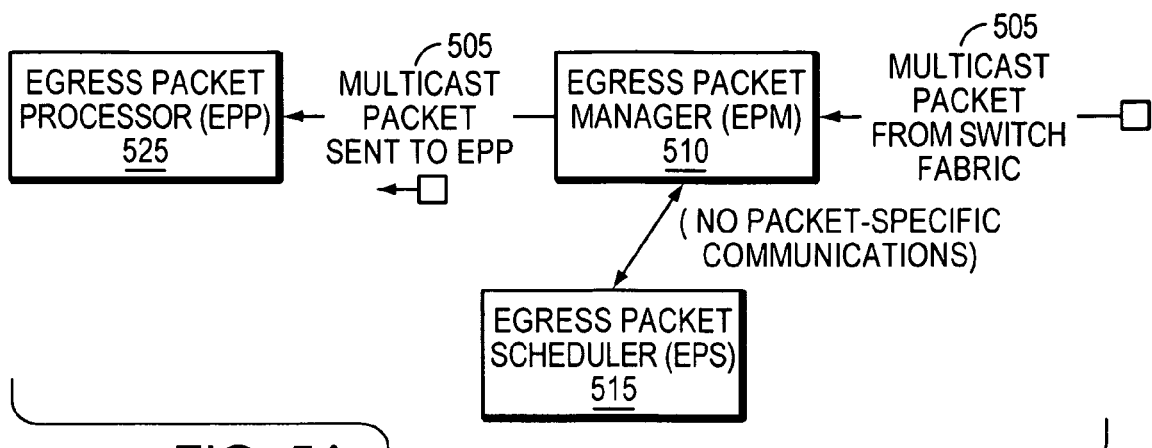
FIGS. 5A-5I are block diagrams of components in a line card at various stages of multicasting a packet in an egress direction.
Figure 5B:
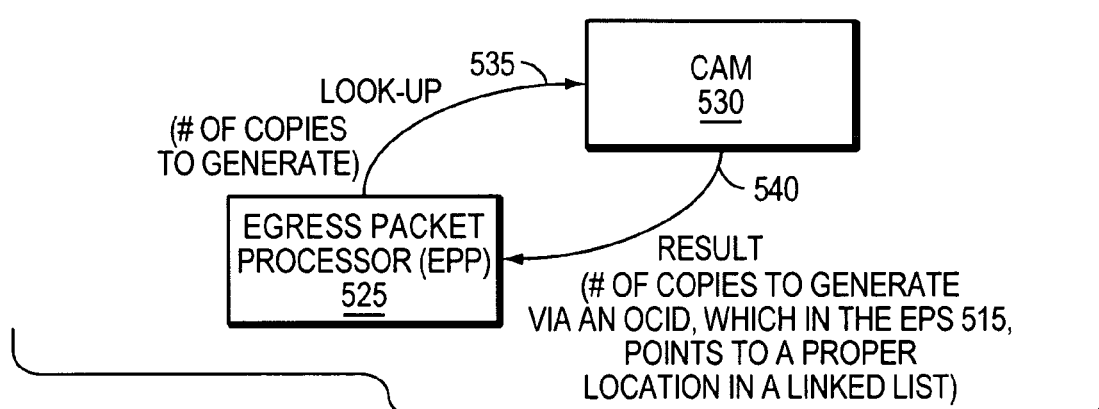

FIG. 5A is a block diagram illustrating an EPM 510, which is connected in a bi-directional manner to an EPS 515, receiving a multicast packet 505. In one embodiment, no specific communication is sent between the EPM 510 and EPS 515 when the EPM 510 initially receives the multicast packet 505. The EPM 510 is also connected to an EPP 525, to which the EPM 510 sends the multicast packet 505. After receiving the multicast packet 405, the EPP 525 performs a look-up or similar process, as illustrated in FIG. 5B. An example look-up may be in the form of "(V1, packet info)," where V1 is a key (e.g., <OCID, VPLSID>) and "packet info" is information about the packet.

FIG. 5B is a block diagram illustrating the interaction between the EPP 525 and a CAM 530 when a look-up 535 is performed. Specifically, the EPP 525 performs a look-up 535 in the CAM 530 to determine how many copies of a multicast packet 505 of FIG. 5A are to be sent, as copies, to multiple destinations. After performing the look-up 535, a result 540 having the number of copies to generate is returned to the EPP 525. It should be understood that other techniques, such as calculating the number of copies to generate, may alternatively be employed to determine the result 540 in other network embodiments or with communications protocols having other forms of information in the multicast packet 505. The result 540 is then sent to the EPM 510 (not shown) for further processing, as illustrated in FIG. 5C.

Figure 5C:
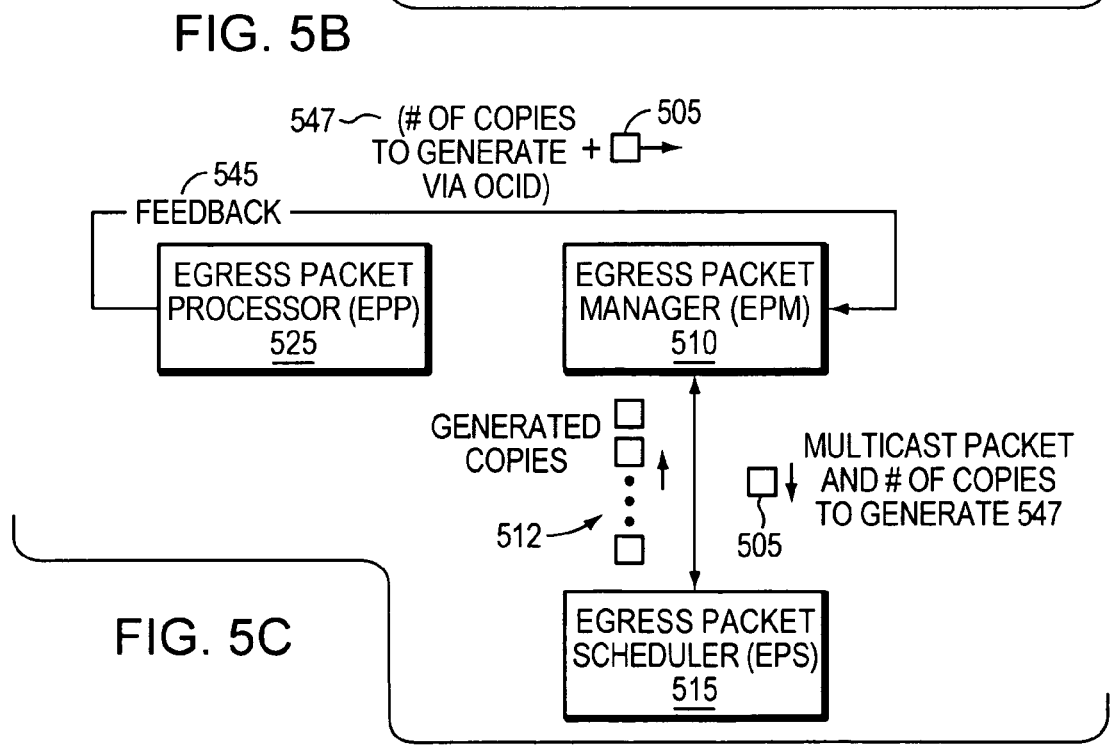

FIG. 5C is a block diagram illustrating feedback 545 being returned to the EPM 510. Specifically, the feedback 545 includes the multicast packet 505 that is sent to the EPM 510 with information containing the number of packets 547 to generate. Upon receiving the multicast packet 505, the EPM 510 sends the multicast packet 505 along with the number of copies to generate 547 to the EPS 515. The EPS 515, using the feedback 545, generates the specified number of copies of the multicast packet 505. After generating the copies 512, the EPS 515 forwards the generated copies 512 to the EPM 510 for further processing, as illustrated in FIG. 5D.

Figure 5D:
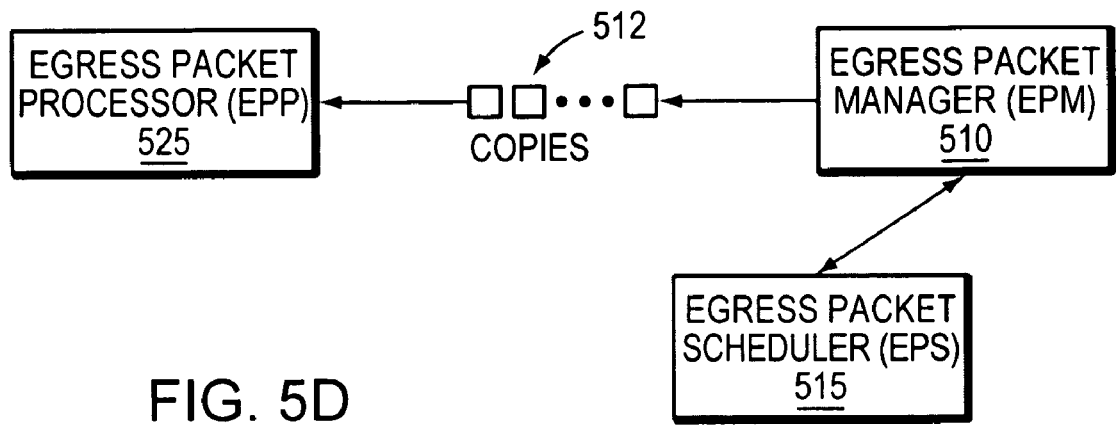
Figure 5E:
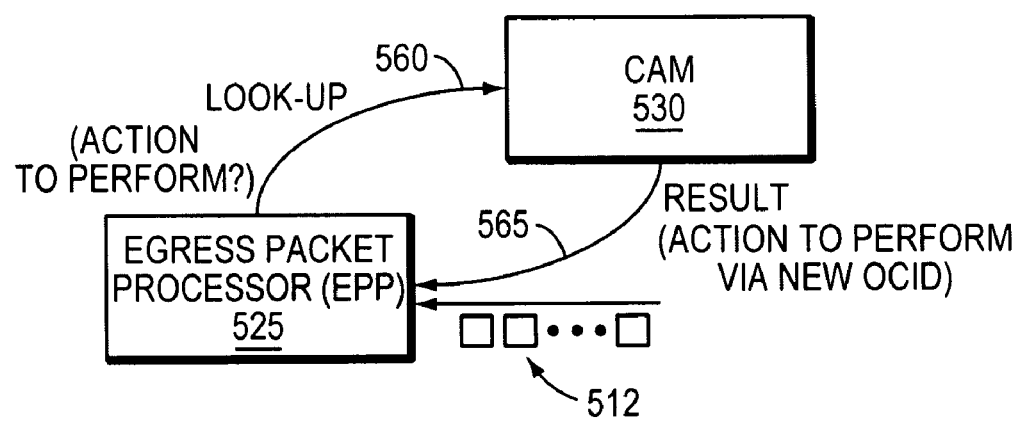

FIG. 5D is a block diagram illustrating how the EPM 510 responds after receiving the copies 512 of the multicast packet 505 generated by the EPS 515. In particular, the EPM 510 sends the generated copies 512 to the EPP 525 to perform another look-up. This look-up provides what action is to be performed for each of the copies 512, as illustrated in FIG. 5E. Example look-ups may be in the form of: (V1, packet info 1), (V1, packet info 2), . . . , (V1 packet info n), where V1 is a key (e.g., <OCID, VPLSID>), and "packet info #" is information about the respective packet.

FIG. 5E is an exploded view of a look-up 560 by the EPP 525 using a CAM 530. As illustrated, the EPP 525, after receiving copies 512 of the generated multicast packets 505 from the EPM 510, performs a look-up 560 to determine the action to perform for each respective copy. The CAM 530 returns a result 565 to the EPP 525 containing the action to perform for each copy based on the information in each multicast packet 505 and a group (e.g., a VPLS) with which the multicast packet is associated. After completing the look-ups 560, the results 565 are returned to the EPS 515, as illustrated in FIG. 5F.

Figure 5F:
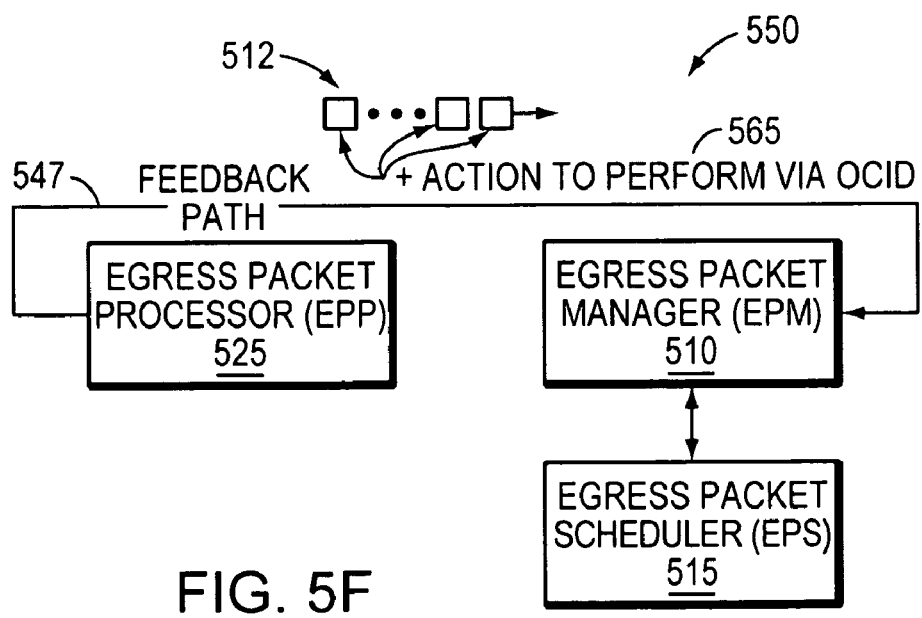

FIG. 5F is a block diagram illustrating a feedback path 547 between the EPP 525 and the EPM 510. The EPP 525 sends the copies 512 of the multicast packets 505 having respective actions to perform 565, collectively packets 550, to the EPM 510, which, in turn, sends the packets 550 to the EPS 515.

Figure 5G:
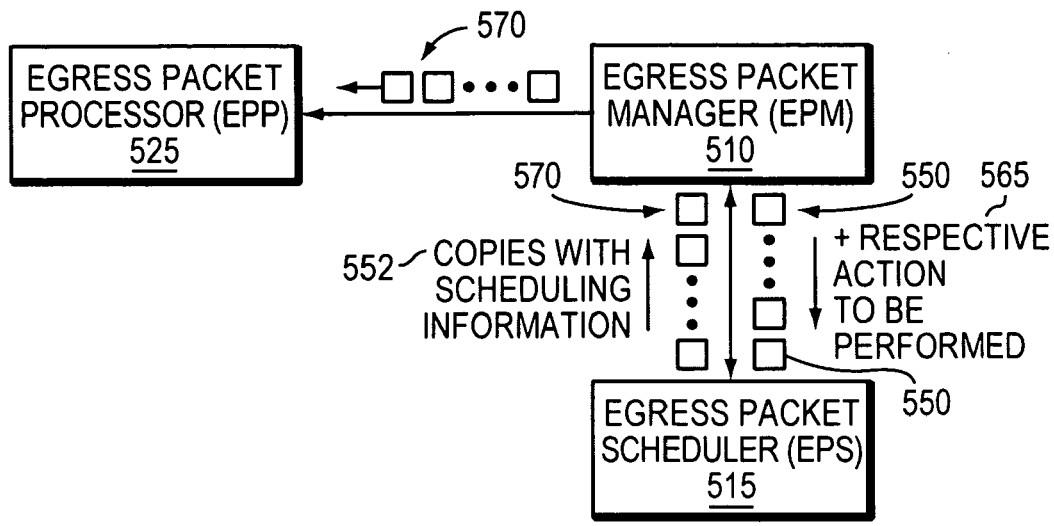

FIG. 5G is a block diagram illustrating the EPS 515 receiving the copies 550 from the EPM 510. As a result of receiving these copies 550 with their respective actions to be performed, the EPS 515 performs the respective actions for each copy. Once the EPS 515 completes all the actions, including scheduling, the resulting multicast packets 570 are sent to the EPM 510 with scheduling information 552. The EPM 510 then sends the multicast packets 570 to the EPP 525 to perform another look-up based on the multicast packets' scheduling information 552, as illustrated in FIG. 5H.

Figure 5H:
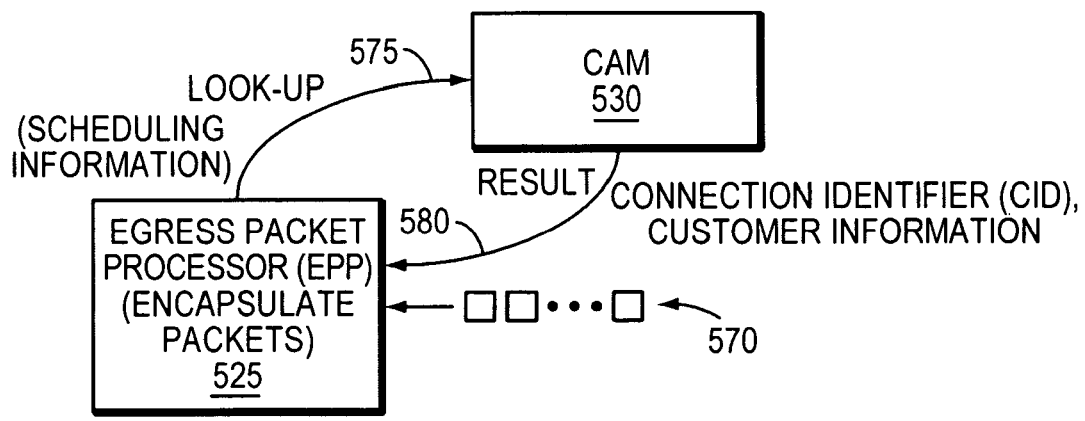

FIG. 5H is a block diagram illustrating the EPP 525 performing a look-up 575 using the scheduling information provided by the EPS 515. The look-up 575 is performed to determine the destination (e.g., Connection Identifier (CID) 582) for each copy 570 of the multicast packet 505. After performing the look-up 575, a result 580 (such as customer information associated with a CID) is returned to the EPP 525. The EPP 525 also encapsulates the data.

Figure 5I:
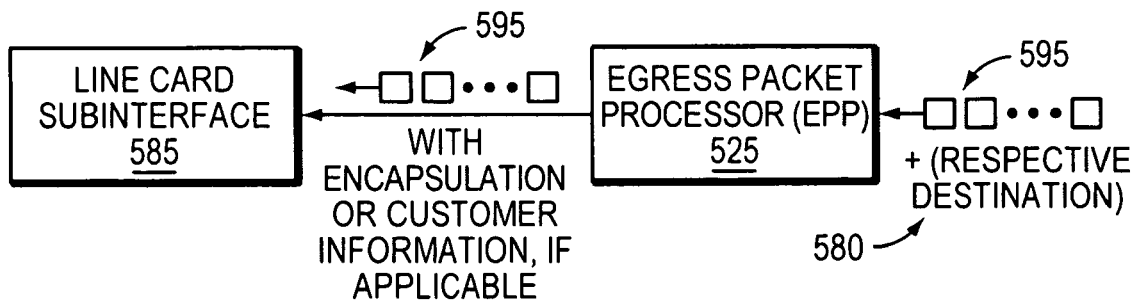

FIG. 5I is a block diagram illustrating the EPP 525 sending copies 595 of the multicast packet 505, optionally with the respective customer information 580 from the third look-up 575 of FIG. 5H, to a line card subinterface 585 of a Programmable Line Module (PLM) (not shown). The PLM, in turn, sends the copies 595 multicast packets 505 to a Provider Edge (PE) Router. After receiving the multicast packets 595, the PE Router forwards the multicast packets 595 to their respective destinations.

Figure 6:
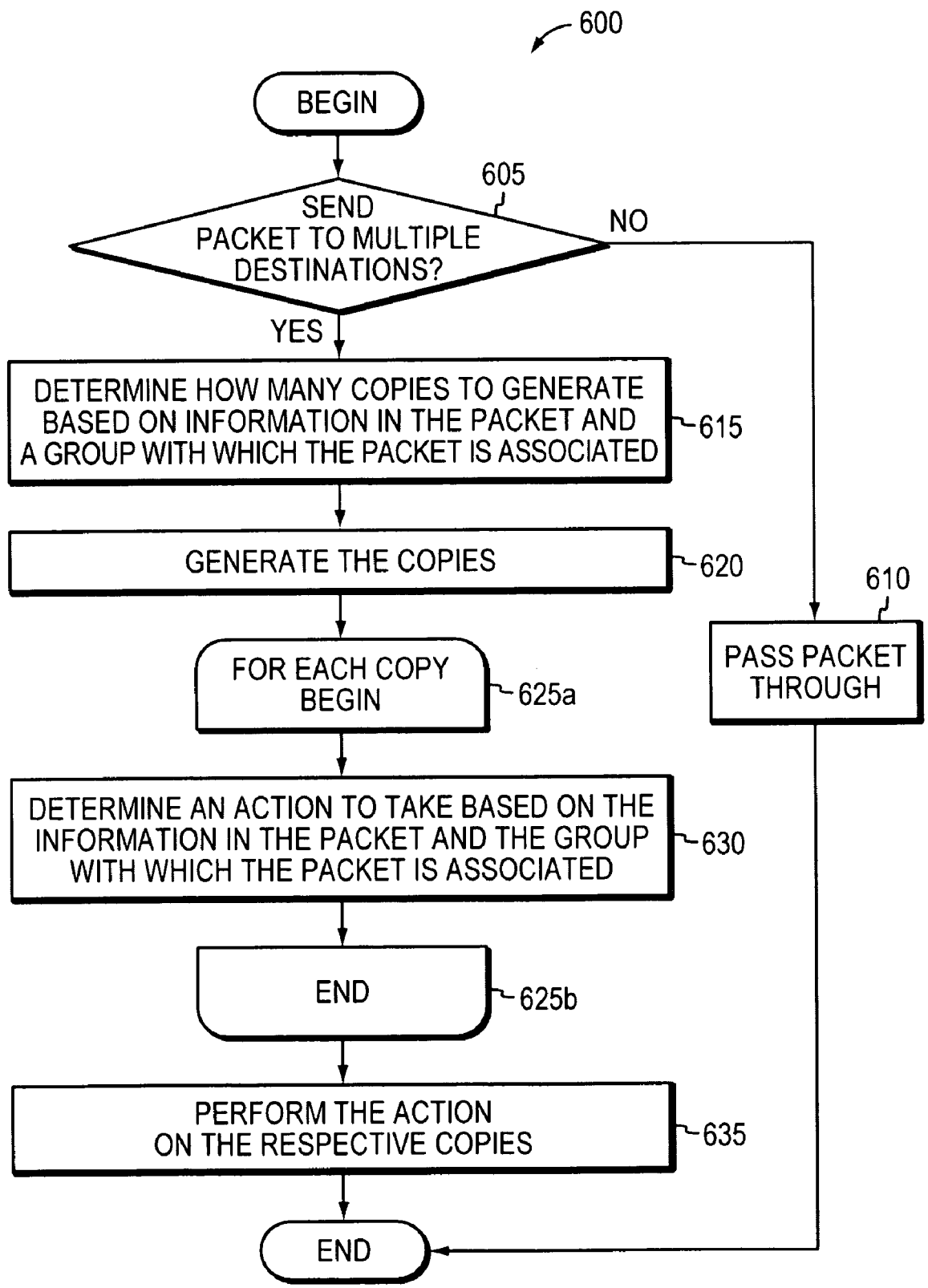
FIG. 6 is a flow diagram of an example technique of performing multicast forwarding according to an embodiment of the present invention.

FIG. 6 is a flow diagram 600 illustrating an example multicast forwarding process. After beginning, the multicast process determines (605) whether a packet is a multicast packet to be copied and sent to multiple destinations. If the multicast packet is not sent to multiple destinations, the multicast packet is passed through (610) to its intended destination. If the multicast packet is to be sent to multiple destinations (605), a determination is made (615) as to how many copies of the multicast packets are to be generated. The copies are generated based on information in the multicast packet and a group with which the multicast packet is associated.

Next, the copies are generated (620). A determination as to what action to perform for each copy (625*a*/625*b*) is made based on the information in the multicast packet and the group with which the multicast packet is associated. Once each copy has a corresponding action (e.g., enforce a Service Level Agreement (SLA), transmit at a given rate, modify the packet, or drop the packet), the action is performed (635) on each copy.

Figure 7:
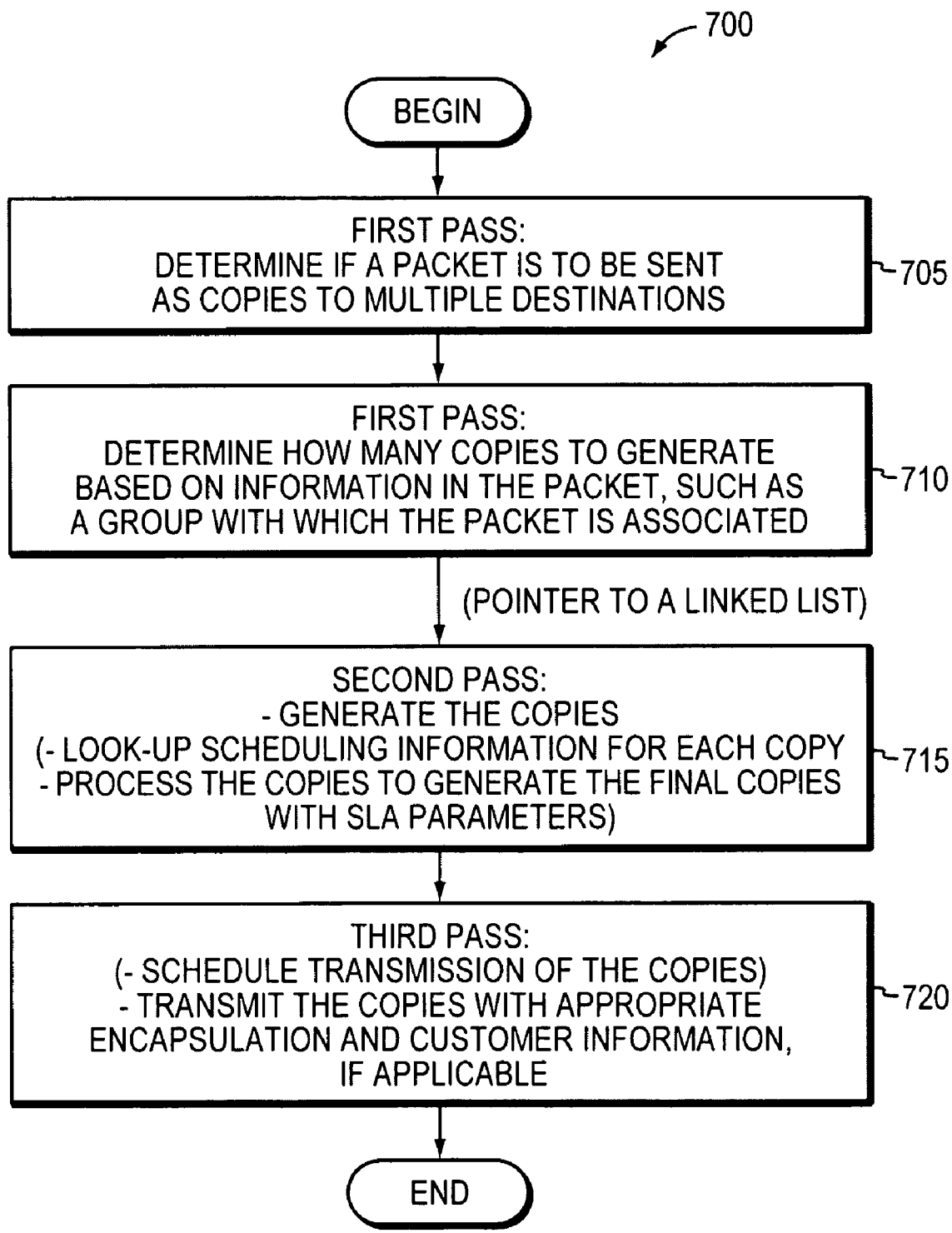
FIG. 7 is a flow diagram corresponding to performing multicast forwarding.

FIG. 7 is a flow diagram 700 of an example process to forward multicast packets. Next, a determination is made as to whether a multicast packet is to be sent as copies to multiple destinations (705). The determination of the number of copies to generate is made based on information in the multicast packet and a group with which the multicast packet is associated (710). The copies are generated (715) based on the determination of 710 and scheduling information for each copy. Finally, the copies are scheduled and transmitted to a destination as indicated in the multicast packet (720).

In view of the foregoing, it should be understood that many embodiments of the present invention are possible. In an exemplary embodiment, a method or corresponding apparatus in an exemplary embodiment of the present invention determines how many copies of a multicast packet are to be sent, as copies, to multiple destinations based on information in the multicast packet and a group (e.g., bridge node) with which the packet is associated. The copies of the multicast packets are then generated. After generating the copies, an action to take for each copy is determined. This determination is made using the information in the multicast packet and based on the group with which the packet is associated. After the action is determined for each copy, the action is performed on each copy. Example actions performed on each copy may include at least one of the following: enforcing a Service Level Agreement (SLA), transmitting at a given rate, modifying the multicast packet, or dropping the multicast packet.

A multicast packet may be encapsulated in order to send the multicast packet in a predefined manner to a destination. The predefined manner may be a format understood by a receiving node.

A determination may be made as to whether a packet is to be sent, as copies, to multiple destinations. This determination may be made using a look-up table or other structure storing information to retrieve the information. In addition, the look-up table may also be used to determine how many copies are to be generated. These look-ups may be performed by a processor accessing Content-Addressable Memory (CAM).

In yet another embodiment of the present invention, memory may be configured to store (i) first information of how many copies of a packet to generate, (ii) second information of an action to take for each copy. The memory may also provide the first information based on information in the packet and a group with which the packet is associated or the second information based on the information in the packet and the group with which the packet is associated. Further, a processor may be coupled to the memory that generates the copies based on the first information from the memory and performs the action on the respective copies based on the second information from the memory. In addition, the processor can be configured to enforce a Service Level Agreement (SLA), transmit a given rate, modify the packet, or drop the packet.

The processor may encapsulate multicast packets to send to a destination in a predefined manner. These multicast packets may be encapsulated in such a manner as to be compatible with a receiving node. Further, memory may be configured to store (i) information of how many copies to generate based on information in a multicast packet and a group with which the multicast packet is associated, and (ii) an action for each copy which is to be performed based on information in the multicast packet and the group in which the multicast packet is associated. This memory may use a single memory element, however, the memory of both (i) and (ii) may use separate memory elements. This stored information is accessible from the memory by using a look-up table. This look-up table/memory is typically Content-Addressable Memory (CAM).

In yet another embodiment of the present invention, a first memory may be configured to store information used to generate multiple copies of a packet. This first memory may be a memory location that is limited in storage capacity. A second memory may be configured to store information of how many copies to generate and what action to take on the multiple copies. The second memory may be expandable in storage capacity.

The first memory may be integrated within an electronics element used to perform other processes. This electronics element that is integrated with the first memory may be an Application-Specific Integrated Circuit (ASIC).

In yet another embodiment of the present invention, a method or corresponding apparatus may determine if a multicast packet is to be sent as copies to multiple destinations. A determination may be made as to how many copies of the multicast packet to generate based on information in the multicast packet and a group with which the multicast packet is associated. This determination may use a look-up table, where the look-up table may be stored in a Content-Addressable Memory (CAM). After making the determination, copies of the multicast packets may be generated based on the information and then transmitted to respective destinations.

While this invention has been particularly shown and described with references to example embodiments thereof, it will be understood by those skilled in the art that various changes in form and details may be made therein without departing from the scope of the invention encompassed by the appended claims.

For example, the Universal Line Card (ULC) 305 of FIG. 3 is illustrated as having multiple electronic components and memory devices. However, in other embodiments, there may be more or fewer components. For example, a single processor or ASIC that incorporates all of the functionality of the components of the ULC 305 may be used.

As discussed in reference to FIG. 4B, a look-up table may be employed in the CAM 470. It should be understood that any form of information storage, such as a table, database, linked list, or array, may be used. Moreover, although a feedback path 485 is illustrated in FIG. 4B (among others) as a path between the EPP 420 and EPM 410, in other embodiment, such as a hardware, firmware, or software embodiment performing the tasks of both the EPP 420 and EPM 410, there may not be a specific physical or logical path. This applies to other "paths" illustrated in the various apparatus embodiments of FIGS. 1-5I.

It should be understood that any of the processes disclosed herein, such as the look-up table, generation of copies of multicast packets, or the flow diagrams of FIGS. 6 and 7, may be implemented in the form of hardware, firmware, or software. If implemented in software, the software may be processor instructions in any suitable software language and stored on any form of computer readable medium. The processor instructions are loaded and executed by a processor, such as a general purpose or application specific processor, that, in turn, performs the example embodiments disclosed herein.

What is claimed is:

1. A method of scaling multicast forwarding, comprising:
    feeding back a first message, based on information in a packet and a bridge group with which the packet is associated, to identify a number of copies of the packet to be sent to multiple destinations;
    replicating the packets to generate the copies based on the first messsage;
    feeding back a second message, based on the information in the packet and the bridge group, to identify an action to perform for each copy; and
    performing the action on the respective copies based on the second message.

2. The method of claim 1 wherein sealing multicast forwarding includes:
    accessing first memory to determine how many copies of the packet to generate based on information in the packet and the bridge group with which the packet is associated;
    accessing second memory to replicate the packets;
    accessing the first memory to determine an action to take for each copy based on the information in the packet and the bridge group;
    accessing the second memory to perform the action on the respective copies;
    accessing the first memory to determine locations the copies are to be sent; and multicast forwarding the copies based on the action and location corresponding to each copy.

3. The method of claim 1 wherein performing the action on the respective copies includes at least one of the following: enforcing a Service Level Agreement (SLA), transmitting at a given rate, modifying the packet, or dropping the packet.

4. The method of claim 1 further including encapsulating the packets to send in a predefined manner to a destination.

5. The method of claim 4 wherein the predefined manner is a format understood by a receiving node.

6. The method of claim 1 further including determining if a packet is a multicast packet to be sent as copies to multiple destinations.

7. The method of claim 6 wherein determining if a packet is to be sent as copies to multiple destinations includes looking-up whether the packet is to be sent to multiple destinations.

8. The method of claim 1 wherein determining how many copies to generate includes looking-up in a table how many copies to generate.

9. The method of claim 1 wherein determining how many copies of the packet to generate or the action to perform includes looking-up the number of copies to generate or action to perform in Content-Addressable Memory (CAM).

10. An apparatus for scaling multicast forwarding, comprising:
    memory that stores (i) first information of how many copies of a packet to generate and (ii) second information of an action to perform for each copy and that provides (iii) the first information based on information in the bridge packet and a group with which the packet is associated and (iv) the second information based on the information in the packet and the bridge group with which the packet is associated;
    a first feedback module to feed back a first message including the first information;
    a second feedback module to feed back a second message including the second information; and
    a processor coupled to the memory that replicates the packet to generate the copies based on the first message and performs the action on the respective copies based on the second message.

11. The apparatus of claim 10 wherein the memory is a second memory, and further including first memory configured to store first information of whether to send copies of the packet to multiple destinations.

12. The apparatus of claim 10 wherein the processor is configured to: enforce a Service Level Agreement (SLA), transmit at a given rate, modify the packet, or drop the packet.

13. The apparatus of claim 10 wherein the processor encapsulates the packets to be sent in a predefined manner to a destination.

14. The apparatus of claim 13 wherein the processor encapsulates the copies to be compatible with respective receiving nodes.

15. The apparatus of claim 10 wherein the memory stores the first information and second information in a look-up table format.

16. The apparatus of claim 10 wherein the memory is Content-Addressable Memory (CAM).

17. An apparatus for scaling multicast forwarding, comprising:
    first memory configured to store information used to generate multiple copies of a packet; and
    second memory configured to store information of how many copies to generate and what action to take on the respective copies;
    a first feedback module to feed back a first message identifying how many copies to generate; and
    a second feedback to module to feed back a second message identifying the action to take on the respective copies.

18. The apparatus of claim 17 wherein the first memory is memory location limited.

19. The apparatus of claim 17 wherein the first memory is memory location limited and the second memory is memory location expandable.

20. The apparatus of claim 17 wherein the first memory is integrated with an electronics element used to perform other processes.

21. The apparatus of claim 17 wherein the first memory is an Application-Specific Integrated Circuit (ASIC).

22. A method of multicast forwarding, comprising:
    determining if a packet is to be sent as copies to multiple destinations;
    feeding back a message, based on information in the packet and a bridge group with which the packet is associated, that identifies how may copies to generate;
    replicating the packet to generate the copies; and
    transmitting the copies.

23. The method of claim 22 wherein determining if a packet is to be sent or determining how many copies to generate includes looking-up if a packet is to be sent or the number of copies to generate in Content-Addressable Memory (CAM).

* * * * *

UNITED STATES PATENT AND TRADEMARK OFFICE
CERTIFICATE OF CORRECTION

| | | |
|---|---|---|
| PATENT NO. | : 7,639,685 B2 | Page 1 of 1 |
| APPLICATION NO. | : 11/603932 | |
| DATED | : December 29, 2009 | |
| INVENTOR(S) | : Vivek Venkatraman et al. | |

It is certified that error appears in the above-identified patent and that said Letters Patent is hereby corrected as shown below:

Claim 1, Column 9, Line 15, please delete "messsage" and insert --message--;

Claim 2, Column 9, Line 21, please delete "sealing" and insert --scaling--.

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,639,685 B2  
APPLICATION NO. : 11/603932  
DATED : December 29, 2009  
INVENTOR(S) : Venkatraman et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 426 days.

Signed and Sealed this

Ninth Day of November, 2010

David J. Kappos
*Director of the United States Patent and Trademark Office*